United States Patent [19]

Hattori

[11] Patent Number: 5,737,762
[45] Date of Patent: Apr. 7, 1998

[54] DATA RECORDING/REPRODUCING SYSTEM CAPABLE OF PROCESSING SERVO PROCESS PROGRAM AT HIGH SPEED

[75] Inventor: Masakatsu Hattori, Tokyo, Japan

[73] Assignee: Kabushiki Kaisha Toshiba, Kawasaki, Japan

[21] Appl. No.: 877,245

[22] Filed: Jun. 17, 1997

Related U.S. Application Data

[63] Continuation of Ser. No. 778,542, Jan. 3, 1997, abandoned, which is a continuation of Ser. No. 348,584, Dec. 2, 1994, abandoned.

[30] Foreign Application Priority Data

Dec. 8, 1993 [JP] Japan ................. 5-308289

[51] Int. Cl.$^6$ .......................................... G06F 13/00
[52] U.S. Cl. ...................... 711/165; 711/101; 711/111
[58] Field of Search ........................... 395/428, 429, 395/430, 431, 432, 492, 438, 439; 711/101, 102, 103, 104, 105, 111, 112

[56] References Cited

U.S. PATENT DOCUMENTS

| | | | |
|---|---|---|---|
| 4,965,501 | 10/1990 | Hashimoto | 318/595 |
| 5,021,898 | 6/1991 | Sakai et al. | 360/78.04 |
| 5,087,997 | 2/1992 | Osada et al. | 360/78.06 |
| 5,146,374 | 9/1992 | Sakurai | 360/78.14 |
| 5,164,931 | 11/1992 | Yamaguchi et al. | 369/44.29 |
| 5,202,994 | 4/1993 | Begun et al. | 395/700 |
| 5,229,896 | 7/1993 | Tohyama et al. | 360/78.07 |
| 5,285,330 | 2/1994 | Masaki | 360/77.08 |
| 5,301,328 | 4/1994 | Begun et al. | 395/411 |

FOREIGN PATENT DOCUMENTS

| | | |
|---|---|---|
| 61-60131 | 3/1986 | Japan . |
| 3-65727 | 3/1991 | Japan ............... G06F 9/24 |

OTHER PUBLICATIONS

Translation of Japanese Patent No. 61–66131 to Yamaguchi, Mar. 27, 1986.
Specification of MB90747, Fujitsu Ltd. pp. 197–198, M.H. Aug. 30, 1994.

Primary Examiner—Tod R. Swann
Assistant Examiner—Conley B. King, Jr.
Attorney, Agent, or Firm—Limbach & Limbach L.L.P.

[57] ABSTRACT

At a predetermined time before activation of a motor of a hard disk drive HDD, a central processing unit CPU transfers a part of a speed control routine or a part of a position control routine from a read only memory ROM via an external bus, and stores the transferred part in a command random access memory RAM. When a servo process is executed, the CPU accesses to the ROM and the command RAM and executes a head positioning control consisting of a speed control and a position control. Thereby, a routine stored in the command RAM can be accessed at high speed. As a result, a servo process time period can be reduced.

11 Claims, 8 Drawing Sheets

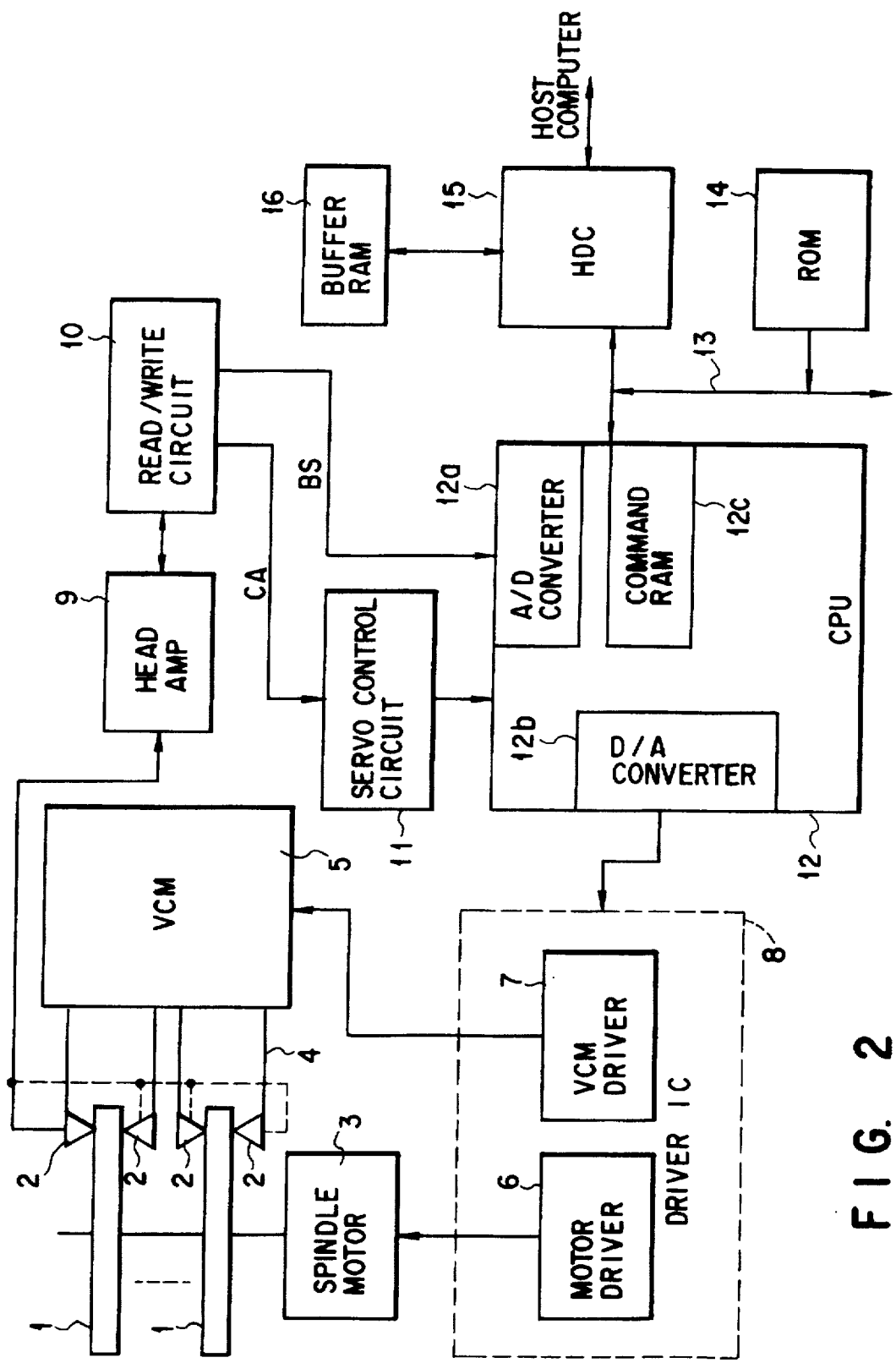
F I G. 2

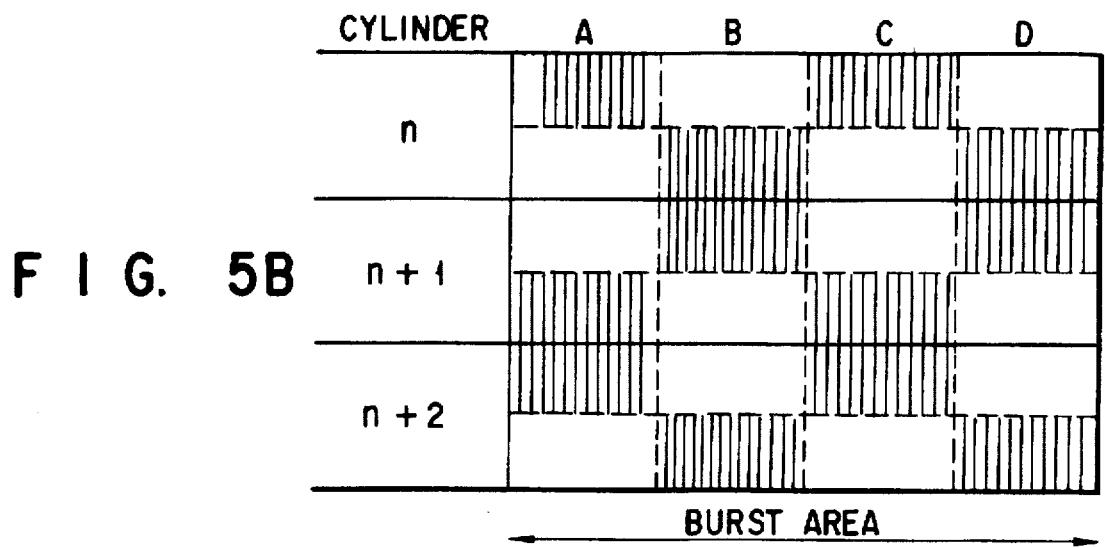
F I G. 5B
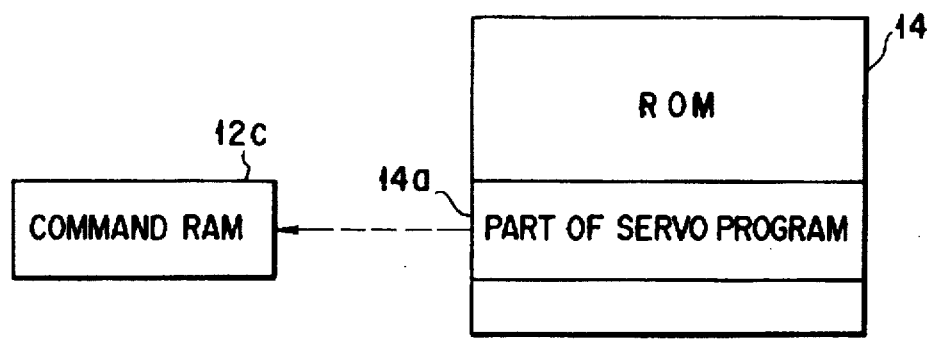
F I G. 6
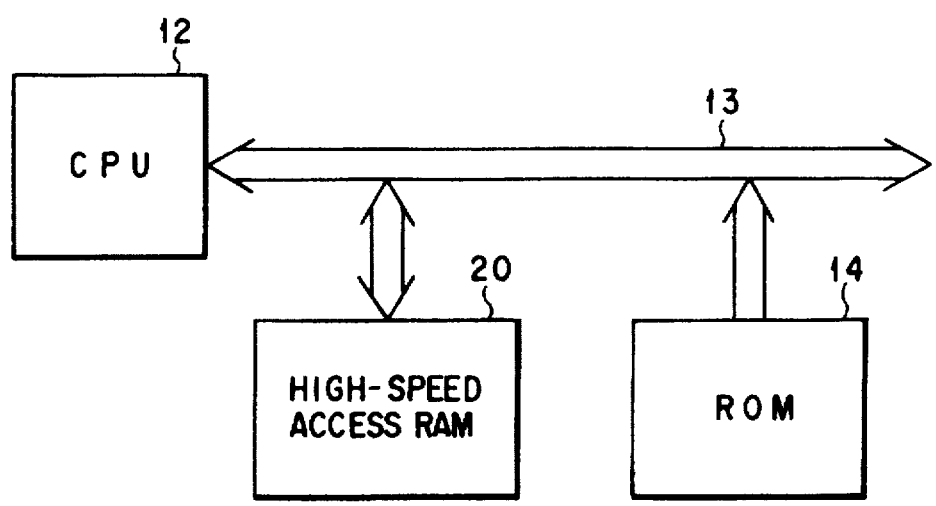
F I G. 12

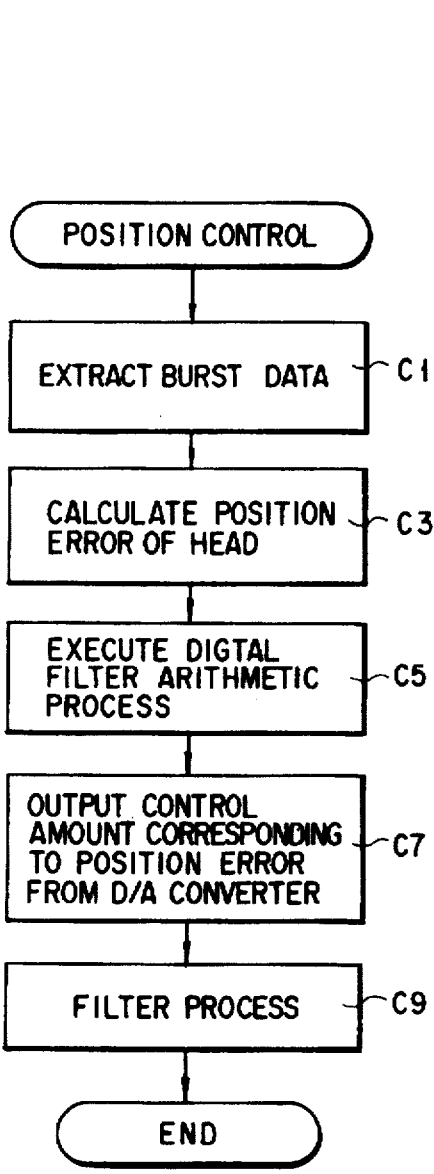
F I G. 9
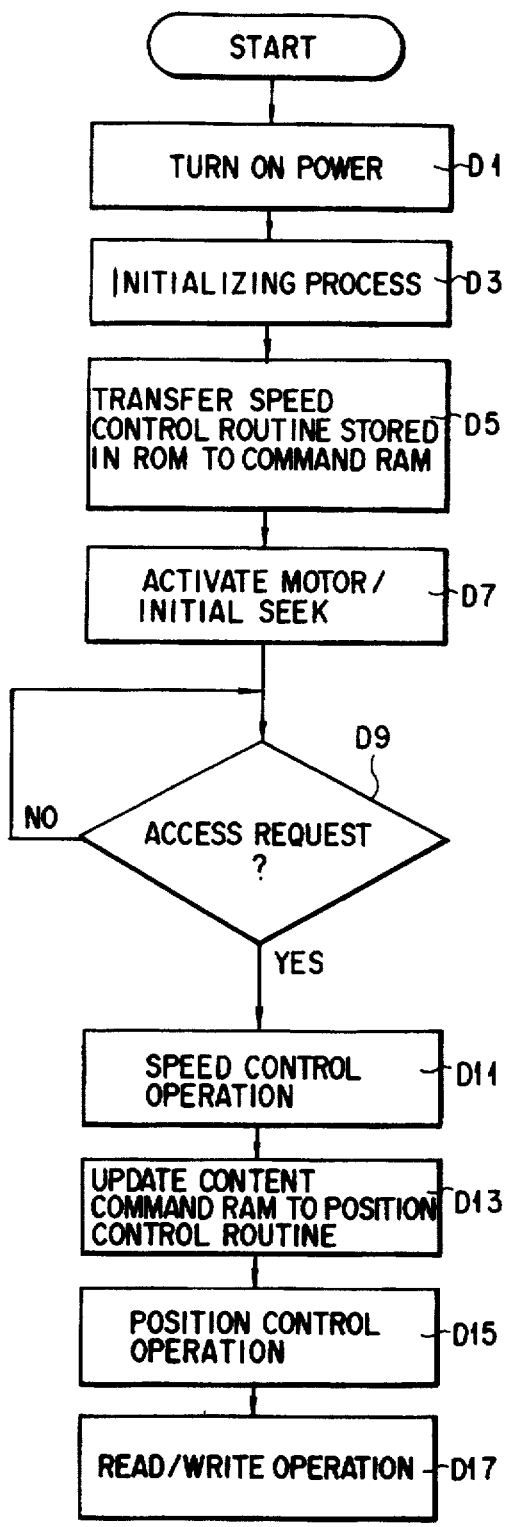
F I G. 10

DATA RECORDING/REPRODUCING SYSTEM CAPABLE OF PROCESSING SERVO PROCESS PROGRAM AT HIGH SPEED

This is a continuation of application Ser. No. 08/778,542 filed on Jan. 3, 1997, abandoned, which is a continuation of application Ser. No. 08/348,584 filed on Dec. 2, 1994, abandoned.

BACKGROUND OF THE INVENTION

1. Field of the Invention

The present invention relates generally to a data recording/reproducing system applicable to, e.g. a hard disk apparatus, and more particularly to a servo process system having a microprocessor for carrying out servo processes including a head position control process and a head speed control process.

2. Description of the Related Art

For example, a conventional data recording/reproducing apparatus such as a hard disk drive (HDD) carries out data recording/reproducing with use of a head, which is positioned at a target position (a target cylinder) on a disk or a recording medium.

In the HDD, principally, a servo process system for controlling the position of a head and a data transfer system for controlling the transfer of data to be recorded/reproduced are performed. In general, the servo process system comprises a microprocessor (hereinafter referred to as "CPU") as a main element, a read/write circuit and a servo control circuit. The data transfer system includes a read/write circuit and a disk controller (HDC) and is controlled by a CPU similar to the CPU provided in the servo process system.

On the basis of a control program pre-stored in a ROM (Read-Only Memory) which is normally a non-volatile memory, the CPU executes various controls such as a servo process control and a data transfer control. The ROM is connected to the CPU via an external bus, and normally the ROM is constituted by an EEPROM (Electrically Erasable and Programmable ROM).

In response to an access request from a host computer connected to the HDD, the CPU reads out a servo program from among the control programs stored in the ROM. Based on the servo program, the CPU controls the position of the head so that the head reaches a target cylinder designated on the disk.

The positioning control for the head includes two main control modes: a speed control mode for moving the head to the target cylinder and a position control mode for positioning the head at the center of the target cylinder. A head position control program including the routines of the speed control and position control is referred to as "servo program" for the purpose of convenience. Thus, the CPU carries out the servo process including the speed control and position control on the basis of the servo program.

If the access request from the host computer is a read access request, the head outputs to the read/write circuit a read signal obtained from a designated sector of the target cylinder. The CPU performs a control operation to transfer reproduced data processed by the read/write circuit to the host computer via the HDC. On the other hand, if the access request is a write access request, write data transferred from the host computer is output to the read/write circuit via the HDC. The read/write circuit converts the write data fed from the HDC to a write current and supplies the write current to the head.

As has been described above, in the servo process, the CPU executes the head positioning control and read/write data transfer control. In this case, as shown in FIG. 1, for example, the CPU executes the head positioning control (MC) and read/write data transfer control (DC) in a time sharing system (TSS). The head positioning control (MC) is carried out on the basis of servo data SD (data surface servo) recorded on a top portion of each sector included in the cylinder (track). The servo data SD comprises principally a cylinder address used at the time of speed control and burst data used at the time of position control. The format of the cylinder address includes an area for recording the servo data SD, as well as an area for recording ID data and user data to be read/written. As FIG. 1 is a schematic view showing a recorded data state of a cylinder based on an CDR (Constant Density Recording) scheme, the ID data, the servo data SD, and the user data are recorded irregularly.

In the HDD, the CPU executes the head positioning control (MC) and read/write data transfer control (DC) in the time sharing system. Normally, the data transfer control is executed after the head positioning control. If the time needed for the head positioning control servo process increases, the data transfer control process is delayed accordingly. As a result, the HDD access speed decreases. In other words, the HDD through-put decreases.

SUMMARY OF THE INVENTION

An object of the present invention is to reduce a processing time of a servo process by a CPU and to execute a head positioning control at high speed, thereby reducing a processing time relating to a data control, increasing the access speed, and enhancing a through-put.

Another object of the invention is to execute a servo control at high speed, thereby enhancing the precision of head positioning, and reducing an error of a speed control.

According to a first aspect of the invention, there is provided a data recording/reproducing system comprising: a first memory for holding a control program; processing means for generating a control amount in accordance with the control program, such that a head for reading/writing data is located at a desired position on a recording medium; positioning means for positioning the head at the desired position on the recording medium in accordance with the control amount generated by the processing means; a second memory to be accessed at a higher speed than the first memory; and transfer means for transferring a predetermined program of the control program held in the first memory to the second memory, whereby the second memory is accessed when the processing means executes the predetermined program.

In this system, after the second memory has been accessed by the processing means, the transfer means rewrites the predetermined program held in the second memory to a second predetermined program of the control program which differs from the predetermined program.

In addition, in this system, the control program includes a speed control program for controlling the speed of movement of the head and a position control program for controlling the position of the head, and the transfer means transfers a predetermined program from the speed control program or the position control program.

According to a second aspect of the invention, there is provided a control method applied to a data recording/reproducing system having a first memory for holding a control program, a second memory accessed at a higher speed than the first memory, and positioning means for positioning a data read/write head on a recording medium in accordance with a control amount, the control method comprising the steps of: a) generating a control amount according to the control program such that the head is positioned at a desired position on the recording medium; and b) transferring a predetermined program of the control program held in the first memory to the second memory, whereby the second memory is accessed when the predetermined program is executed in the step (a).

This method further comprises the step of: c) rewriting the predetermined program held in the second memory to a second predetermined program of the control program which differs from the predetermined program, after the second memory is accessed in the step (a).

In this method, the control program includes a speed control program for controlling the speed of movement of the head and a position control program for controlling the position of the head, and a predetermined program from the speed control program or the position control program is transferred in the step (b).

In the above structure, the processing means performs a servo process on the basis of a control program including a position control program and a speed control program, which is held in the first memory such as a non-volatile memory. Thus, the processing means controls the positioning means. The transferring means transfers the predetermined program from the first memory to the second memory which is accessible at high speed so that the processing means can execute the predetermined program by accessing the second memory.

According to the present invention, the servo program necessary for the head position control operation is transferred to the high-speed accessible memory, thereby reducing the processing time of the servo process by the CPU. Therefore, the head position control can be executed at high speed and, as a result, the access speed of the data recording/reproducing apparatus can be increased and the through-put can be enhanced.

Furthermore, the position control routine of the servo program is transferred to the high-speed accessible memory and executed, thereby enhancing the head positioning precision. Besides, the speed control routine of the servo program is transferred to the high-speed accessible memory and executed, thereby reducing the error of the speed control.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the structure of a hard disk drive to which a data recording/reproducing system according to a first embodiment of the present invention is applied;

FIGS. 5A and 5B illustrate an example of a track format applied to a recording medium of the hard disk drive as shown in FIG. 2, FIG. 5A showing an example of the entire track format and FIG. 5B showing a recording state of burst data recorded on a plurality of cylinders;

FIG. 6 illustrates a concept of program transfer in the first embodiment as shown in FIG. 2;

FIG. 9 is a flow chart illustrating a position control operation as mentioned in the flow chart of FIG. 7;

FIG. 10 is a flow chart illustrating a data recording/reproducing system according to a second embodiment of the invention;

FIG. 12 is a flow chart illustrating a data recording/reproducing system according to a third embodiment of the invention.

DETAILED DESCRIPTION OF THE PREFERRED EMBODIMENTS

Figure 1:
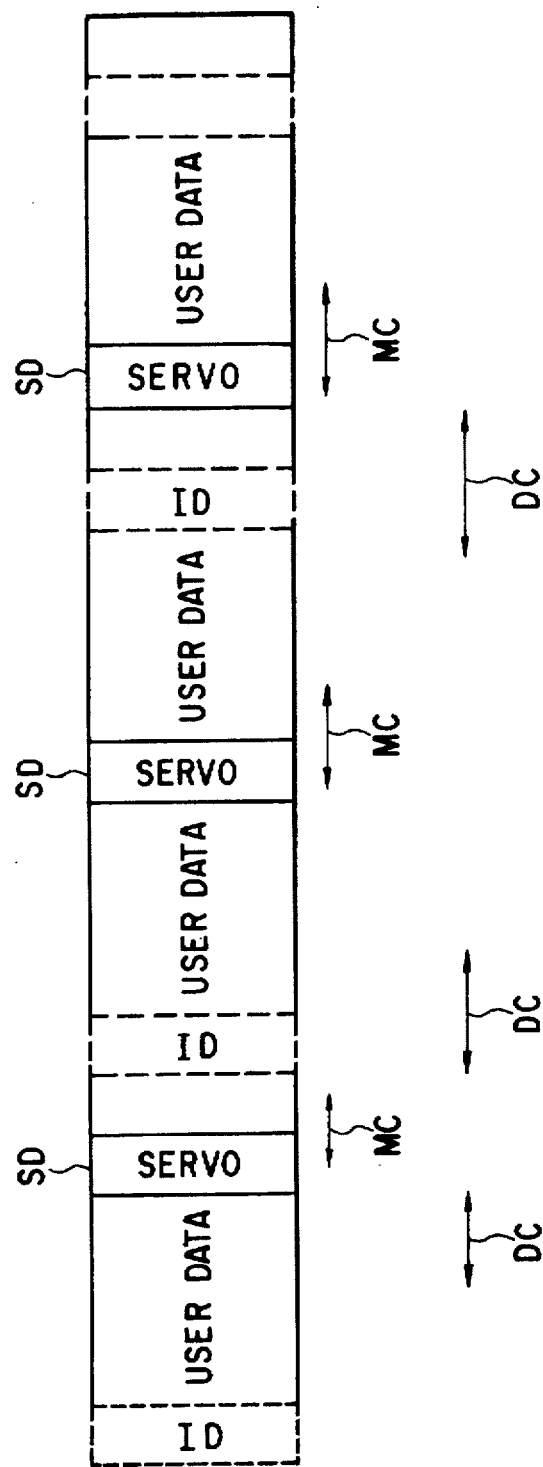
FIG. 1 is a schematic view for explaining servo control and data transfer control of a conventional HDD.

Embodiments of the present invention will now be described with reference to the accompanying drawings.

(First Embodiment)

FIG. 2 shows the entire structure of a hard disk drive (HDD) to which a data recording/reproducing system according to a first embodiment of the present invention is applied. As is shown in FIG. 2, in the HDD, at least one disk 1 is rotated at high speed by a spindle motor 3, and heads 2 are provided so as to be opposed to data surfaces of the disk 1. If the number of disks 1 is one, two heads 2 are provided so as to be opposed to both surfaces of the disk 1. The head 2 is attached to a head movement mechanism or a carriage 4. The head 2 moves in the radial direction of the disk 1 in accordance with the rotation of the carriage 4. The head 2 is positioned on a designated target cylinder (a target track) by a servo process system (a head position control mechanism) described later. Normally, data read/write is performed in units of a sector.

The carriage 4 is driven by a voice coil motor (VCM) 5. The VCM 5 is driven by a VCM driver 7. The spindle motor 3 is driven by a motor driver 6. In this embodiment, the motor driver 6 and VCM driver 7 are constituted integrally as a driver IN (Integrated Circuit) 8 called "double driver."

A read/write circuit 10 receives a read signal output from the head 2 and amplified by a head amplifier 9 and performs signal processing necessary for a data reproducing operation. Besides, the read/write circuit 10 performs signal processing necessary for a data recording operation and supplies a write current corresponding to write data to the head 2 via the head amplifier 9.

The read/write circuit 10 executes a normal user data recording/reproducing process and a servo data reproducing process necessary for a head positioning control servo process. The servo data includes a cylinder address CA representing the current position of the head 2 and burst data (burst signal) BS indicating a position error in the cylinder.

Figure 4:
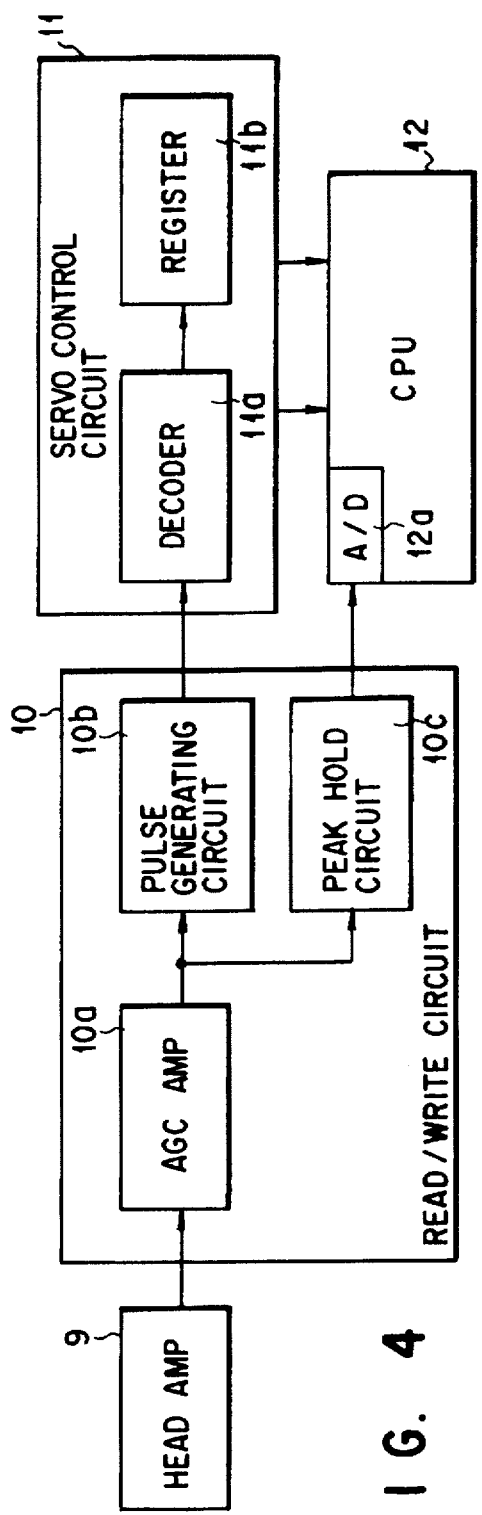
FIG. 4 is a block diagram showing structures and connections of a read/write circuit and a servo control circuit of the hard disk drive as shown in FIG. 2.

As is shown is FIG. 4, the read/write circuit 10 includes an AGC amplifier 10a having an AGC (Automatic Gain Control) function, a pulse generating circuit 10b and a peak hold circuit 10c. The AGC amplifier 10a receives the read signal amplified by the head amplifier 9 and amplifies this signal so that the read signal from an inner cycle and that from an outer cycle are both having a same amplitude. Noises of the read signal is removed by the AGC amplifier 10a. The pulse generating circuit 10b has a pulse peak detector (PPD) for discriminating read data and syn pulses from the read signal output from the head 2. And the pulse generating circuit 10b outputs data pulses including the cylinder address CA by differentiating the signal output from the AGC amplifier 10a and by comparing the differentiated signal using a comparator. The peak hold circuit 10c receives the output signal from the AGC amplifier 10a and samples/holds the peak of the read signal from the head 2 and outputs an analog signal including the burst signal BS. This peak holding is executed at each timing e.g. burst A, B, C and D shown in FIG. 5B.

The servo control circuit 11 is a circuit for carrying out signal processing necessary for servo processing. The servo control circuit 11 extracts the cylinder address CA from the data pulses output from the read/write circuit 10 and holds the extracted cylinder address CA. The servo control circuit 11 outputs a sample timing signal for extracting the burst signal BS and executes a sector pulse extraction process. The servo control circuit 11, as shown in FIG. 4, comprises a decoder 11a for extracting a cylinder address CA, and a register 11b for holding the extracted cylinder address CA.

The CPU 12 is a structural element relating to the subject matter of the invention. The CPU 12 and the servo control circuit 11 constitute a servo process system for effecting head position control. Furthermore, the CPU 12 executes various drive controls for the HDD, including read/write data transfer control, in addition to the head position control. The CPU 12 executes various drive controls on the basis of the control program stored in the ROM 14. The ROM 14 is a non-volatile memory constituted by, e.g. an EEPROM or a PROM (Programmable ROM) and is connected to the CPU 12 via an external bus 13.

The CPU 12 is a one-chip microprocessor and includes an A/D converter 12a and a D/A converter 12b as input/output units, as well as a command RAM (Random Access Memory) 12c as an internal read/write memory. In this embodiment, the command RAM 12c has a 2 KByte-capacity. In the CPU 12, the A/D converter 12a converts the supplied burst signal BS to digital data. In addition, in the CPU 12, the D/A converter 12b converts a control amount necessary for servo process (a control amount necessary for head position control, etc.) to an analog signal and outputs the analog signal to the driver IC 8.

Figure 3:
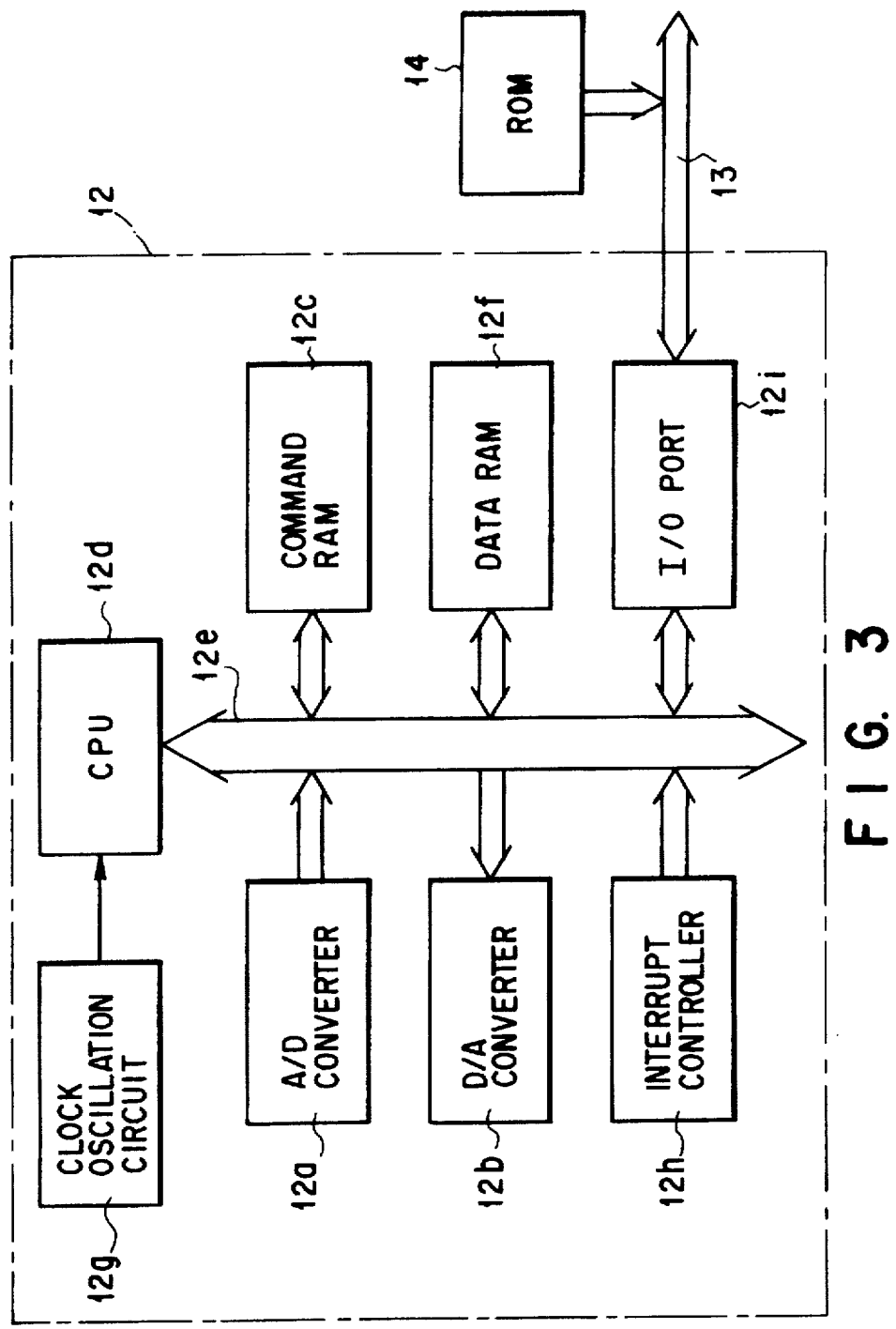
FIG. 3 is a block diagram showing an internal structure of a microprocessor of the hard disk drive as shown in FIG. 2.

As is shown in FIG. 3, the CPU 12 includes, in addition to the A/D converter 12a, D/A converter 12b and command RAM 12c, a central processing unit (a CPU in a narrow sense) 12d, an internal bus 12e, a data RAM 12f, a clock oscillation circuit 12g, an interrupt controller 12h, and an I/O port 12i. The I/O port 12i is connected to an external bus 13 and functions as an interface for exchanging data and programs with an external unit such as a ROM 14. The data RAM 12f stores various data necessary for control processes such as a servo process, while the command RAM 12c is designed to store programs. In the present embodiment, the ROM 14 has a capacity of 64 Kbytes.

The HDC 15 constitutes an interface between the HDD and the host computer. The HDC 15 is a controller designed principally to transfer read/write data. The HDC 15 temporarily stores in a buffer RAM 16 read data read out from the disk 1 in units of a sector and write data to be written on the disk 1. The HDC 15 and CPU 12 constitute a system for data transfer control.

Figure 5A:
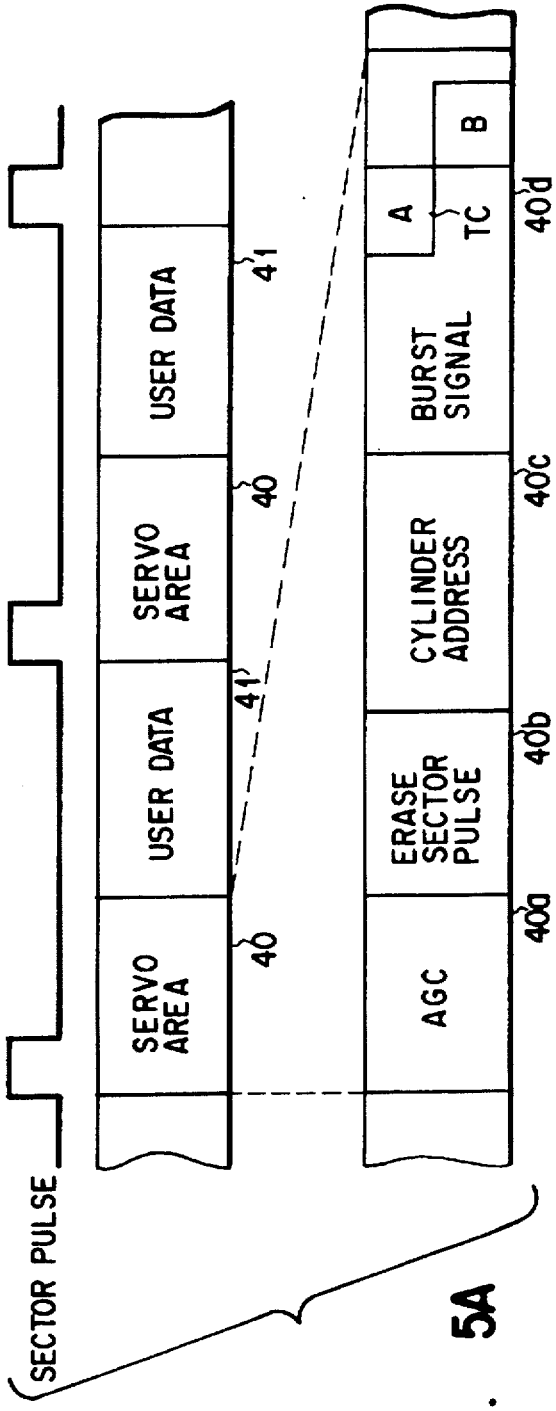

Each cylinder of the disk 1 is divided into a plurality of sectors. As is shown in FIG. 5A, each sector mainly comprises a servo area 40 for recording servo data and a user area 41 for recording user data. The servo area 40 includes an AGC area 40a, an erase area (sector pulse detection area) 40b, a cylinder address area 40c and a burst area 40d, as shown in FIG. 5A. The AGC area 40a is a recording area for maintaining a recovery time, for example, immediately after data write has been executed. A sync signal is recorded on the AGC area 40a is an area for recording a pattern which does not appear in normal data, and such a pattern is used as a starting point of each process executed by the CPU, etc. The cylinder address area 40c is an area for recording a track number, etc., and, in some cases, data relating to the sector. The burst area 40d is an area for recording a burst signal and has position error signals A and B having different phases and being displaced from each other by a half track with respect to a track center TC. FIG. 5B is a conceptual figure showing in detail the burst area 40d. Specifically, FIG. 5B shows the positional states of burst signals (A to D) recorded on burst areas of cylinders n, n+1 and n+2.

The operation of the first embodiment will now be described.

(Basic Operation)

Figure 7:
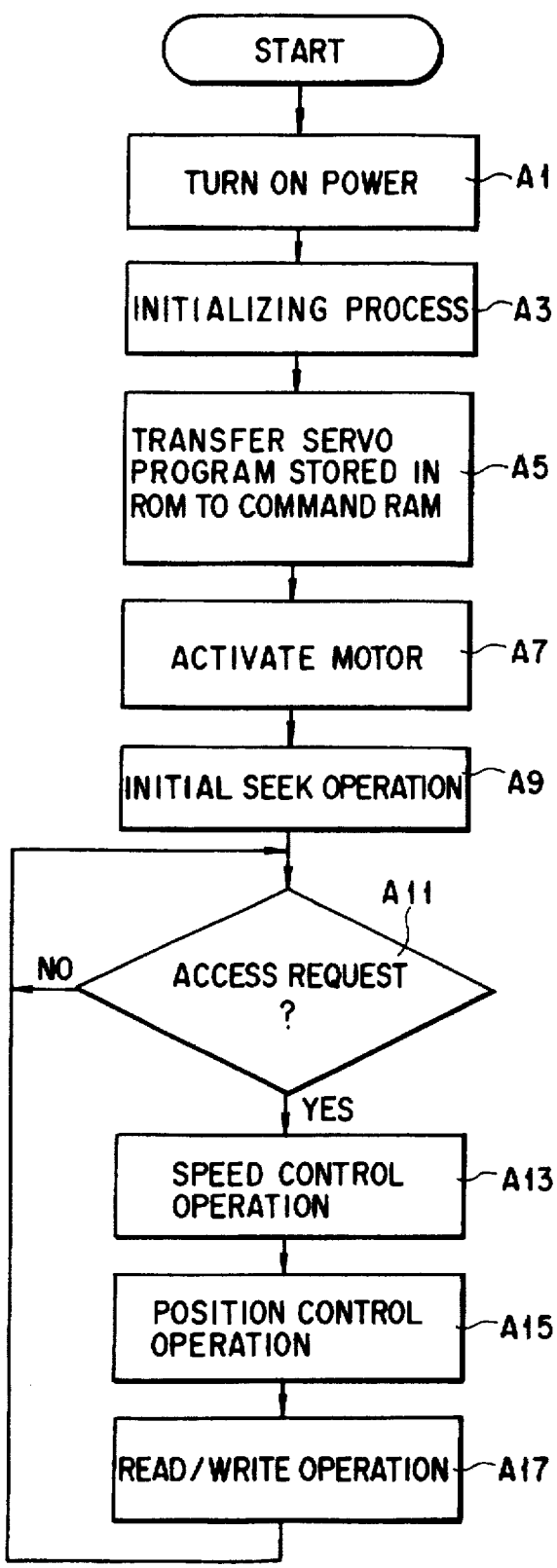
FIG. 7 is a flow chart illustrating an operation of a data recording/reproducing system according to the first embodiment as shown in FIG. 2.

When power is supplied to the HDD, the CPU 12 carries out various initializing processes (FIG. 7, steps A1 and A3). The initializing processes are, for example, data clear processes for the command RAM 12c and data RAM 12f as shown in FIG. 3, and initial value setting processes for various registers (not shown).

In the prior art, the CPU 12 controls the motor driver 6 of the driver IC 8 to activate the spindle motor 3 and start the rotation of the disk 1. In the present embodiment, before activating the motor 3, the CPU 12 accesses the ROM 14 via the external bus 13 and reads out the servo program from among the control programs stored in the ROM 14. The servo program is transferred to the I/O port 12i. The CPU 12 operates to store the transferred servo program in the command RAM 12c via the I/O port 12i and internal bus 12e (step A5). When the servo program is transferred, address conversion is also performed. A program stored in the ROM 14, which corresponds to the transferred servo program, is not accessed by the CPU 12.

The servo program is a kind of control program necessary for head position control and consists of a speed control routine and a position control routine. Since the command RAM 12c is an internal memory, it can be accessed at high speed. However, the memory capacity of the RAM 12c is less than that of the external memory, e.g. ROM 14. For example, in the present embodiment, as described above, the capacity of the command RAM 12c is 2 KBytes, and that of the ROM 14 is 64 KBytes. In fact, as shown in FIG. 6, a part of the servo program 14a is transferred to the command RAM 12c. Specifically, this part of the servo program is a part of the speed control routine or a part of the position control routine.

After the servo program has been transferred, the CPU 12 controls the motor driver 6 of the driver IC 8, as in the prior art, thereby activating the spindle motor 3 and starting the rotation of the disk 1 (step A7). Subsequently, the CPU 12 effects an initial seek operation (step A9). In the initial seek operation, the CPU 12 controls the VCM driver 7 and carries out a servo process to position the head 2 at a cylinder 0 or a reference position on the disk 1.

If an access request is sent from the host computer (YES in step A11), the CPU 12 operates to move the head 2 onto a target cylinder corresponding to a logic address to be accessed, thereby executing a read/write operation. Specifically, the CPU 12 executes the speed control, thereby moving the head 2 to the target cylinder (step A13). Moreover, the CPU 12 executes the position control to position the head 2 at the center of the track of the target cylinder (step A15).

When the position control for the head is completed, the read/write operation is carried out (step A17). In the read/write operation, the CPU 12 and HDC 15 execute read/write data transfer. Specifically, in the read operation, the read/write circuit 10 reproduces read data from a read signal read out by the head 2 from the designated sector of the target cylinder, and transfers the reproduced read data to the HDC 15. The HDC 15 stores read data in units of a sector in the buffer RAM 16, and transfers the read data of the sector corresponding to the logic address to be accessed.

On the other hand, in the write operation, the HDC 15 stores in the buffer RAM 16 the write data transferred from the host computer, and transfers the write data in units of sector to the read/write circuit 10 successively. The read/write circuit 10 converts the write data to a write current and supplies the write current to the head 2. The head 2 converts the write current to a recording magnetic field and records the associated data on the user area (see FIG. 5A) of the designated sector of the target cylinder.

After the above process is completed, the CPU 12 returns to step A11 and waits for an access request from the host computer.

(Speed Control Operation)

The aforementioned speed control operation for head position control will now be described with reference to FIG. 8. The CPU 12 executes speed control to move the head 2 to a target cylinder on the basis of the speed control routine of the servo program accessed from the ROM 14.

Specifically, the CPU 12 calculates the current position of the head 2, which is moving, by acquiring the cylinder address CA (steps B1 and B5). While moving in the radial direction of the disk 1, the head 2 outputs to the read/write circuit 10 a read signal corresponding to a cylinder address and burst data of the servo area 40, as shown in FIG. 5A.

In the servo control circuit 11, as shown in FIG. 4, the decoder 11a extracts the cylinder address CA from the data pulse output from the read/write circuit 10, and the extracted cylinder address CA is held in the register 11b. The CPU 12 receives the cylinder address CA held in the register 11b and calculates the current position (current cylinder) of the head 2 which is moving. At this time, the CPU 12 extracts the burst data from the analog signal output from the read/write circuit 10, on the basis of a sample timing signal from the servo control circuit 11 (step B3). The burst data BS is used in the position control operation which will be described later.

Subsequently, the CPU 12 calculates a distance of movement between the obtained current position and the designated target cylinder (step B7), and then calculates the speed of movement of the currently moving head 2 (step B9). On the basis of the calculated distance of movement, a target speed table provided in advance (normally stored in the ROM 14) is searched and the target speed is calculated (step B11).

The CPU 12 determines the amount of control on the basis of an error between the calculated target speed and the speed of movement. The amount of control is converted to an analog signal through the D/A converter 12b, thereby controlling the VCM driver 7 (steps B13 and B15). In other words, feedback control for driving the VCM 5 is executed so as to reduce the error between the target speed and the speed of movement to zero.

In the above speed control operation, the CPU 12 transfers, for example, a part of the servo program in the speed control routine, which corresponds to steps B5 to B13, to the internal command RAM 12c at the time of initialization (see step A5 in FIG. 7). Thus, when the speed control routine is accessed and executed, the CPU 12 can carry out the process corresponding to steps B5 to B13 at high speed, since the access speed of the command RAM 12c is higher than that of the ROM 14.

It is therefore possible to shorten a process time period from when the cylinder address or burst data has been input to when the amount of control is output via the D/A converter 12b. Since the process time period is shortened, it is possible to reduce an error between the speed recognized by the CPU 12 and the actual speed of the head 2 at the time the amount of control is input. In other words, while the CPU 12 is executing the process of steps B5 to B15, the varying speed of the head 2 can be controlled. Thereby, the error between the target speed and the actual speed at the time of speed control can be reduced. As a result, the speed control operation for moving the head 2 to the target cylinder can be performed at high speed.

(Position Control Operation)

The position control operation for positioning the head will now be described with reference to FIG. 9. The CPU 12 executes the position control for positioning the head 2 at the center of the track of a target cylinder, on the basis of the position control routine of the servo program accessed from the ROM 14.

Specifically, the CPU 12 extracts the burst data along with the cylinder address CA (step C1). As is shown in FIG. 4, in the read/write circuit 10, the peak hold circuit 10c holds a peak of the analog burst signal BS (position error signals A and B). On the basis of the sample timing signal from the servo control circuit 11, the A/D converter 12a in the CPU 12 converts the held peak value of the burst signal BS to digital burst data, and the converted digital burst data is input to the CPU 12.

Subsequently, the CPU 12 calculates a position error of the head 2 with respect to the target cylinder, on the basis of the obtained burst data (A, B) (step C3). Normally, the CPU 12 finds the position error Ref from the equation:

$$Ref = \frac{A-B}{A+B}$$

Further, the CPU 12 executes a digital filter arithmetic operation process to effect phase compensation for a calculated position error (step C5). Specifically, the filter arithmetic operation process is executed from equation (1), given below, by using a position error Ref of a latest sample, a position error Ref of a sample, which precedes the latest sample by i-sample(s) (i=1 to 4), and an output value (a control amount) of the sample which precedes the latest one by i-sample(s) (i=1 to 4):

$$y(i) = [b(i)x(i) + b(i+1)x(i+1) + \qquad (1)$$
$$b(i+2)x(i+2) + b(i+3)x(i+3)] -$$
$$[a(i+1)y(i+1) + a(i+2)y(i+2) +$$
$$a(i+3)y(i+3)]$$

where y(i) is an output value of the sample preceding the latest sample by i-sample(s), x(i) is a position error Ref of the sample preceding the latest sample by i-sample(s), and a(i) and b(i) are parameters of the digital filter.

The CPU 12 determines the amount of control obtained from the calculated position error Ref and filter arithmetic operation process, and converts the amount of control to an analog signal through the D/A converter 12b, thereby controlling the VCM driver 7 (step C7). Specifically, feedback control is effected to drive the VCM 7 so that the position error of the head 2 with respect to the track center may become zero. By using the amount of control output from the D/A converter 12b, part of the filter calculation of the next position control is executed in advance (step C9).

In the position control operation, for example, in the position control routine, the CPU 12 operates to transfer part of the servo program corresponding to steps C3 and C5 to the internal command RAM 12c at the time of the aforementioned initialization (see step A5 of FIG. 7). Thus, when the CPU 12 accesses and executes the position control routine, the CPU 12 can perform the process corresponding to steps C3 and C5 at high speed, since the access speed of the command RAM 12c is higher than that of the ROM 14.

Thus, the process time period from when the burst data has been input to when the amount of control is output through the D/A converter 12b is reduced. Since the process time period is shortened, it is possible to reduce the difference between the position of the head 2 recognized by the CPU 12 and the actual position of the head 2 at the time the amount of control is output. In other words, while the CPU 12 is performing the process of steps C3 and C5, the positional deviation of the head 2 can be prevented. Thereby, the error between the target position for position control and the actual position can be reduced. As a result, the position control operation for positioning the head 2 at the track center of the target cylinder can be performed quickly.

As has been described above, to quickly perform the speed control and position control operations means to quickly position the head and to shorten the servo process time period. For example, in the hard disk drive as shown in FIG. 2, the occupation time of the CPU for the servo process is about 180 μs when the command RAM 12c is not used, whereas it is about 120 μs when a part of the servo program relating to the speed control and position control is transferred to the command RAM 12c.

In general, when the access request is a read access request, the HDC holds data in a predetermined buffer. If the buffer is filled with data, the held data is sent to the host computer. There is a case where the CPU 12 needs a considerable time period to effect the position control (servo process) and the disk 1 rotates several times until the head 2 is positioned on a predetermined sector. If the servo process requires a considerable time period and data cannot fully be written in the buffer RAM 16, the HDC must stop temporarily the data output. If the HDC can output the data held in the buffer at a rate of 4 Mbytes/s and about 14 ms is needed for a single rotation of the disk, when the data output to the host computer is temporarily stopped for a time period corresponding to a single rotation of the disk 1, output of about 50 KBytes of data is stopped as a result. Thus, if the time relating to the servo process is shortened, as mentioned above, the efficiency of data transmission with the host computer is enhanced, too.

(Second Embodiment)

A second embodiment of the data recording/reproducing system according to the present invention will now be described. Like the above-described first embodiment, the second embodiment is applied to a hard disk drive, and a detailed description of the structure of the second embodiment is omitted.

In the first embodiment, the CPU 12 performs, at the time of initialization (at a predetermined time before activation of the motor), a process to transfer a part of the servo program stored in the ROM 14 to the internal command RAM 12c. In this case, the part of the servo program is either a part of the speed control routine or a part of the position control routine. The reason for this is that the internal command RAM 12c is normally, e.g. about 1 KByte, and is designed as a high-speed access memory with a small memory capacity.

In the operation of the second embodiment, as illustrated in FIG. 10, a part of the speed control routine and a part of the position control routine are time-shared and transferred to the command RAM 12c, so that each routine can be accessed at high speed.

Upon turn-on of power, the CPU 12 completes various initializing steps (steps D1 and D3) and then transfers and stores the part of the speed control routine from the ROM 14 to the command RAM 12c (step D5). The CPU 12 then activates the spindle motor (step D7). In response to an access request (step D9) from the host computer, the CPU 12 transfers and stores the part of the position control routine from the ROM 14 to the command RAM 12c at a predetermined time before the start of the position control operation (in FIG. 10, after the completion of the speed control operation (step D11)) (step D13). Thus, the memory content of the command RAM 12c is updated from the part of the speed control routine to the part of the position control routine. The other control operations are the same as in the first embodiment, and a detailed description thereof is omitted. These include step D15, position control operation, which is same as step A15, and step D17, read/write operation, which is same as step A17.

Figure 8:
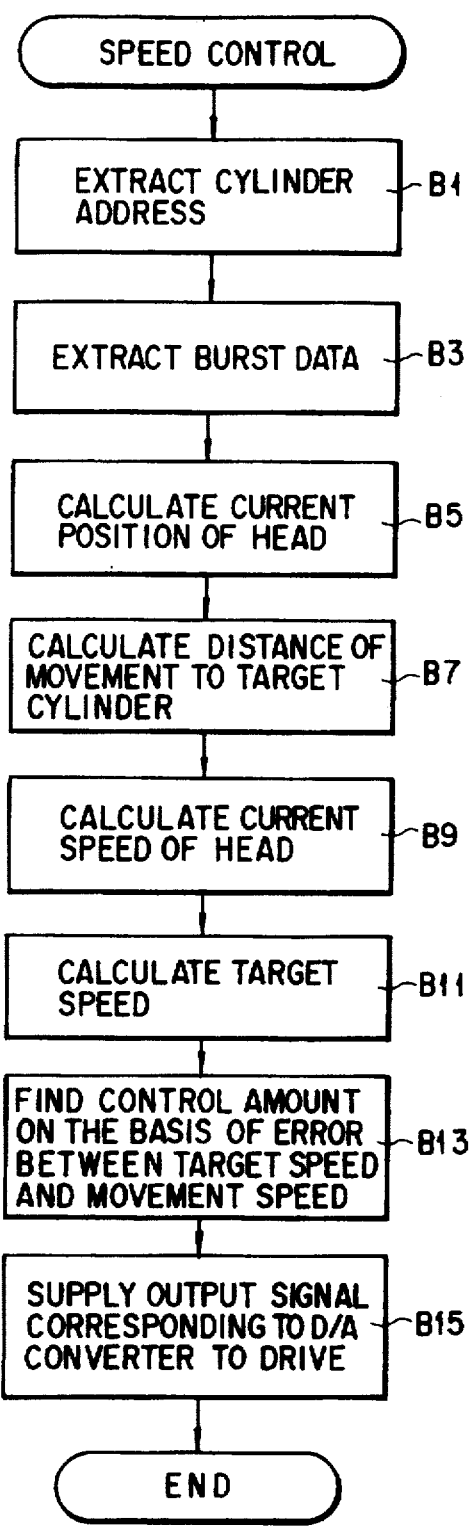
FIG. 8 is a flow chart illustrating a speed control operation as mentioned in the flow chart of FIG. 7.

According to the second embodiment, the process corresponding to steps B5 to B13 shown in FIG. 8 is performed at high speed at the time of the speed control operation, and the process corresponding to steps C3 and C5 shown in FIG. 9 is performed at high speed at the time of the position control operation. Accordingly, as compared to the first embodiment, the servo process time can be further reduced. As a result, the access speed of the data recording/reproducing apparatus can be increased with an enhanced through-put.

In the second embodiment, after the speed control is completed in step D11, the program in the command RAM 12c is rewritten to the position control routine. This rewriting process is not necessarily performed after the speed control operation. The rewriting process may be executed before the beginning of the position control operation.

Figure 11:
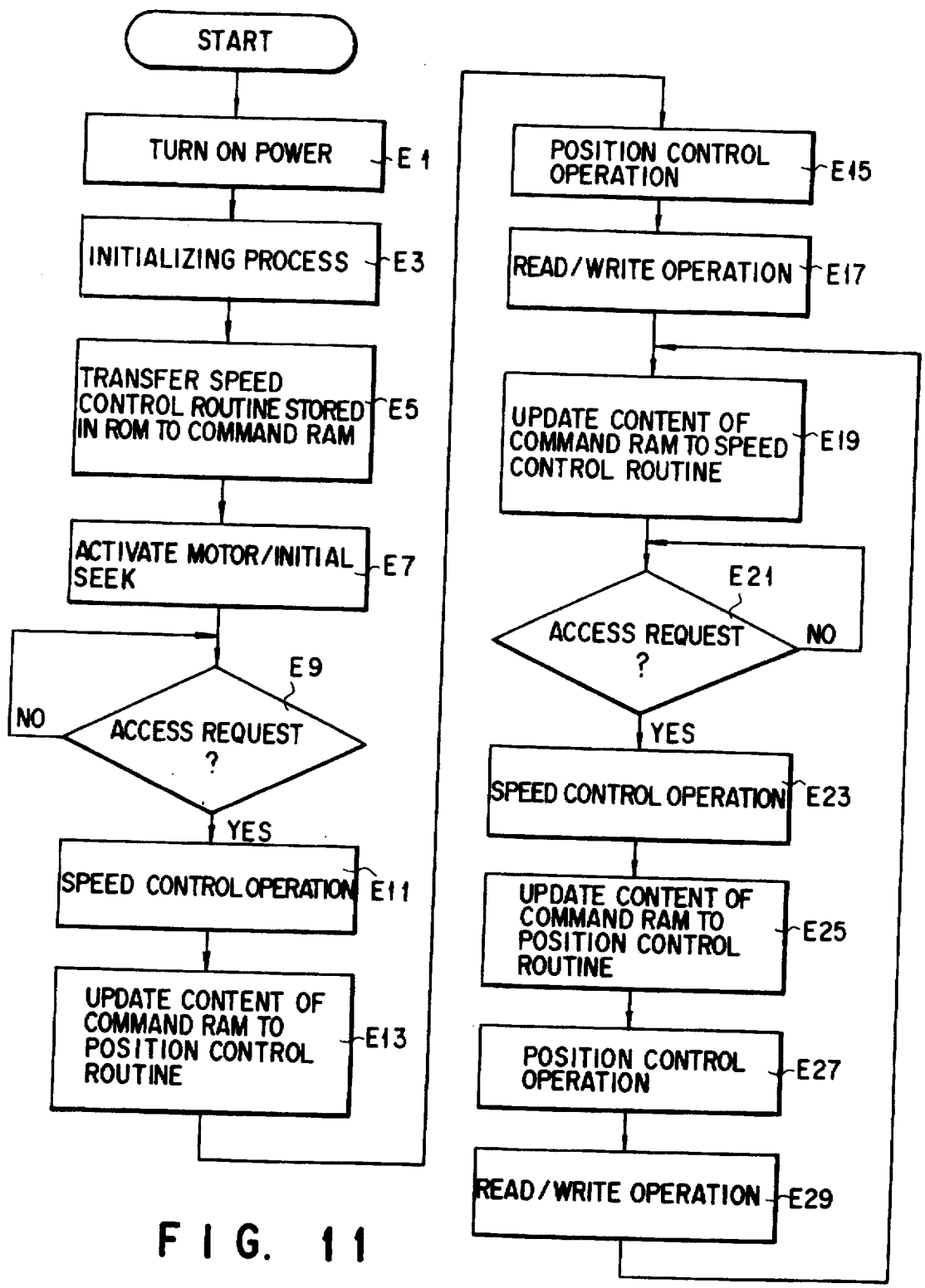
FIG. 11 is a flow chart illustrating the operation of a modification of the second embodiment.

According to the flow chart of FIG. 10, in the second embodiment, the process relating to the speed control and position control is performed at high speed in response to only the first access request after power is turned on. In order to obtain the same advantage with respect to all access requests after power is turned on, the hard disk drive to which the second embodiment is applied may be designed to operate according to the flow chart of FIG. 11. Steps E1, E3, E5, E7, E11, E13, E15, and E17 shown in FIG. 11 are the same as steps D1, D3, D5, D7, D11, D13, D15 and D17, respectively. In FIG. 11, the CPU 12, after completing the read/write process in response to the first access request after turn-on of power (YES in step E9), rewrites the content of the command RAM 12c to the speed control routine once again (step E19). If the access request is issued thereafter (YES in step E21), the speed control is performed (step E23). After the speed control is completed, the content of the command RAM 12c is rewritten to the position control routine once again (step E25). When the CPU 12 completes the position control process and read/write process (steps E27 and E29), the control returns to step E19 once again and the content of the command RAM 12c is rewritten to the speed control routine.

By the above process, with respect to all access requests issued after turn-on of power, the process corresponding to steps B5 to B13 shown in FIG. 8 can be performed at high speed in the speed control operation mode and the process corresponding to steps C3 and C5 shown in FIG. 9 can be performed at high speed in the position control operation mode.

(Third Embodiment)

A third embodiment of the data recording/reproducing system according to the present invention will now be described.

In the first and second embodiments, the CPU 12 executes an operation to store in the internal command RAM 12c a part of the servo program transferred from the ROM 14. In the third embodiment, as shown in FIG. 12, a part of the servo program is transferred from the ROM 14 by using the high-speed access RAM 20 connected to the external bus 13, and not by using the command RAM 12c. The other structural features and operations are the same as in the first and second embodiments, and a description thereof is omitted. An SRAM (Static RAM), etc. may be used as high-speed access RAM 20.

According to the third embodiment, the present invention is applicable to an HDD using a CPU which does not have command RAM 12c as internal memory. Like the ROM 14, a high-speed access RAM 20 is externally provided on the CPU. Thus, the high-speed access RAM 20 can be easily mounted. Moreover, as compared to the command RAM 12c having a small memory capacity, the high-speed access RAM 20 having a large memory capacity can be provided. Accordingly, it is possible to store not only a part of the position control routine and/or a part of the speed control routine, but also the entire position control routine and/or the entire speed control routine.

As has been described above in detail with reference to the first to third embodiments, according to the present invention, the servo program necessary for the head position control operation is transferred to the high-speed access memory, thereby reducing the processing time of the servo process by the CPU. Thus, the head position control can be performed at high speed, and accordingly the access speed of the data recording/reproducing apparatus can be increased, thereby enhancing the through-put.

Furthermore, the precision of head positioning is enhanced by transferring the position control routine of the servo program to the high-speed access memory and executing the transferred position control routine. In addition, the error of speed control can be reduced by transferring the speed control routine of the servo program to the high-speed access memory and executing the transferred speed control routine.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording/reproducing system comprising:
    a first memory for holding a control program which includes a data transfer control program for controlling data to be recorded/reproduced and a servo control program;
    processing means for generating a control amount in accordance with said servo control program, such that a head for reading/writing data is located at a desired position on a recording medium;
    positioning means for positioning said head at the desired position on said recording medium in accordance with the control amount generated by said processing means;
    a second memory to be accessed at a higher speed than said first memory, said second memory having a capacity smaller than a capacity of said first memory;
    transfer means for transferring a predetermined part of said servo control program held in said first memory to said second memory;
    wherein said second memory is accessed when said processing means executes said predetermined part of said servo control program transferred by said transfer means, and wherein said first memory is accessed when said processing means executes a portion of said control program other than said predetermined part of said servo control program transferred by said transfer means; and
    wherein said processing means, said second memory and said transfer means are included in a one chip microprocessor.

2. The data recording/reproducing system according to claim 1, wherein said first memory comprises a non-volatile memory.

3. The data recording/reproducing system according to claim 1, wherein after said second memory has been accessed by said processing means, said transfer means rewrites said predetermined part of said servo control program held in said second memory to another predetermined part of said servo control program which differs from said predetermined part of said servo control program.

4. The data recording/reproducing system according to claim 1, wherein before said processing means generates the control amount according to said servo control program, said transfer means executes the transfer of said predetermined part of said servo control program upon turn-on of power to said data recording/reproducing system.

5. The data recording/reproducing system according to claim 1, wherein said servo control program includes a speed control program for controlling the speed of movement of said head and a position control program for controlling the position of the head, and
    said predetermined part of said servo control program being either a servo program of said speed control program or a servo program of said position control program.

6. The data recording/reproducing system according to claim 5, wherein said speed control program includes a program for carrying out a head position calculating process for calculating the position of said head, a movement distance calculating process for calculating the distance of movement to a target cylinder, a head movement speed calculating process, a target speed calculating process, and a process for calculating a control amount from said movement speed and said target speed.

7. The data recording/reproducing system according to claim 5, wherein said position control program includes a program for carrying out a calculation process for calculating an error between a desired position and a current position of said head, a filtering process for the calculated error, and a calculation process for calculating a control amount corresponding to said error as subjected to the filtering process.

8. A method of operating a data recording/reproducing system having a first memory for holding a control program which includes a data transfer control program for controlling data to be recorded/reproduced and a servo control program, a second memory accessed at a higher speed than said first memory and having a capacity smaller than a capacity of said first memory, and positioning means for positioning a data read/write head on a recording medium in accordance with a control amount, said method comprising the steps of:

a) transferring a predetermined part of said servo control program held in said first memory to said second memory;

b) accessing said second memory to execute said predetermined part of said servo control program for generating a control amount according to said servo control program such that said head is positioned at a desired position on said recording medium; and c) accessing said first memory to execute a portion of said control program other than said predetermined part of said servo control program, to operate said data recording/reproducing system other than to position said head at a desired position on said recording medium.

9. The control method according to claim 8, further comprising the step of:

c) rewriting said predetermined part of said servo control program held in said second memory to another predetermined part of said servo control program which differs from said predetermined part of said servo control program, after said second memory is accessed in said step (a).

10. The control method according to claim 8, wherein in said step (b), before the control amount is generated according to said servo control program in said step (a), the transfer of said predetermined part of said servo control program is executed upon turn-on of power to said data recording/reproducing system.

11. The control method according to claim 8, wherein said servo control program includes a speed control program for controlling the speed of movement of said head and a position control program for controlling the position of the head, and said predetermined part of said servo control program corresponds to either said speed control program or said position control program.

* * * * *